March 19, 1957     M. C. SULLENDER ET AL     2,785,697
VALVE
Filed Feb. 18, 1952
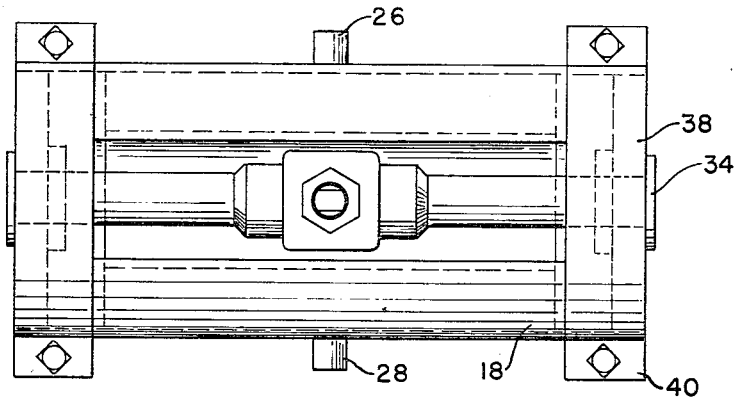
FIG. I
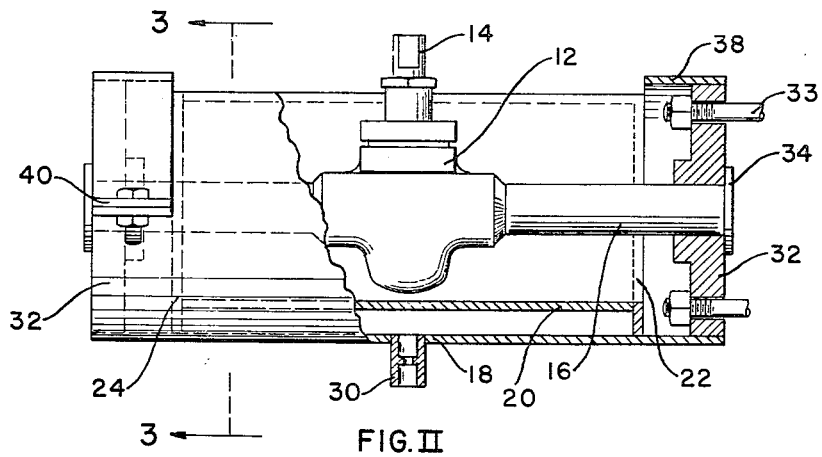
FIG. II
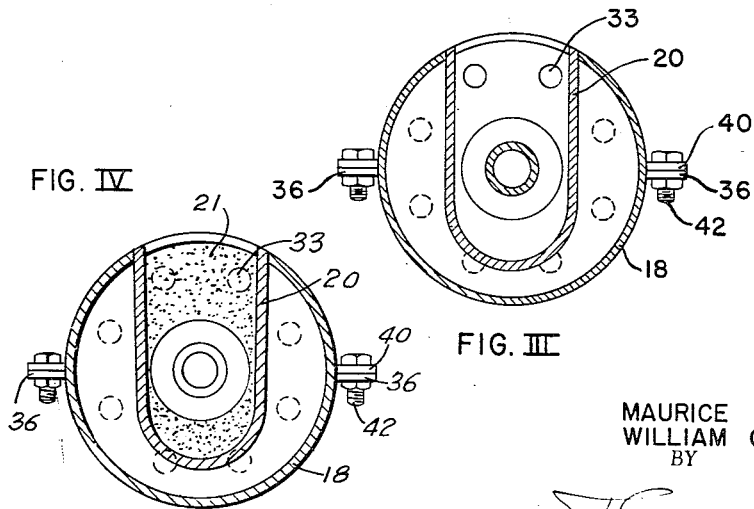
FIG. IV     FIG. III
INVENTORS
MAURICE C. SULLENDER
WILLIAM C. GREEN
BY

2,785,697

VALVE

Maurice C. Sullender and William C. Green, Houston, Tex., assignors to Diamond Alkali Company, Cleveland, Ohio, a corporation of Delaware Application February 18, 1952, Serial No. 272,122

4 Claims. (Cl. 137—340)

This invention relates to a structure for the control of the temperature of a valve, and more particularly relates to means for maintaining valves at suitable temperatures for valving of high freezing point liquids, and specifically relates to improved structures for maintaining valves at very high operating temperatures.

In sundry operations in the chemical industry, as well as in other fluid handling problems, maintenance of substantial temperatures on lines carrying high freezing point fluids which otherwise would solidify in the lines and block the same, is well-known. The problem of maintaining temperatures on the lines themselves normally does not present great difficulty as the same may suitably be protected with lagging, or in case of very high temperature service, with jackets and the like, through which may be passed high temperature heat transfer fluids, whereby suitable temperatures are maintained on the lines themselves. Since lines carrying fluids of very high freezing point normally require no servicing at all, it is usually satisfactory to mount such jackets permanently around the line and permanently maintain the heat transfer fluid therein.

At various points in lines, however, it is always necessary to provide for valving in order to interrupt the flow of the material through the line. At these points it is undesirable permanently to secure jackets and the like to the valves which are of necessity constructed of moving parts, since such parts are subject to wear and must be serviced from time to time and occasionally completely removed and replaced. The expense and disability to the entire line of removing and replacing a valve is sufficiently serious without necessitating the complete removal and replacement of the temperature-maintaining jacket, though prior to the present invention, no adequate solution of this problem has been suggested.

Thus, it has been proposed heretofore completely to cover a valve with a liquid-tight envelope adapted to contain in the space between the valve externals and the inside of the envelope, heat transfer fluid, the envelope being welded to the valve body itself. It will be appreciated that this structure has the disadvantage cited above, in that when the valve is worn, the entire structure must be taken down in order to replace parts of the valve, or perhaps the entire valve, and its envelope will have to be discarded and replaced with a new unit.

It has also been proposed to form a heat transfer-containing envelope about a valve and bolt the same to the valve flanges and parts of the valve. This is a very small improvement over the proposal noted above of welding to the valve body, since repair on the valve or other maintenance of the valve necessitates complete dismantling of the structure and since, moreover, the valve itself is in direct contact with the heat transfer fluid.

The present invention has as its prime object the provision of means for maintaining a suitable temperature on a valve in a line adapted to provide passage for high temperature freezing liquids, which means may be removably applied to the valve body and need not be specifically attached thereto but can be simply removed and replaced or simply removed and applied to a replaced valve without disturbing or dismantling either the valve or the means used to maintain the same at desired temperatures.

A further object of the present invention is to provide an envelope to be placed about a valve for valving of high temperature freezing fluid, which envelope comprises a substantially three-sided body of a length greater than the length of the valve in the line, having an opening in the top thereof slightly greater than the transverse width of the valve body, and adapted to be placed about the valve and removably secured thereto for the purpose stated.

Other and further objects of the present invention will appear to those skilled in the art from the following description, wherein a preferred form of the invention is set forth in detail, which description includes the drawing in which, Fig. I is a top-plan view of a valve having the jacket of the present invention applied thereto, Fig. II is a side elevation, partly in vertical section, of the structure of Fig. I, and Fig. III is a section taken on the line 3—3 of Fig. II, Fig. IV is a section taken along the line 3—3 of Fig. II illustrating another embodiment of the invention wherein a finely-divided heat transfer material is provided around a valve.

The structure shown in the drawing includes a plug valve generally indicated at 12, the details of which are omitted since they form no part of the present invention, it being understood that many types of valves could be employed, the plug valve 12 being shown as exemplary. The valve 12 has stem 14 and is mounted to interrupt the flow of fluid in line 16.

A substantially U-shaped jacket is formed of outer case 18, which is suitably secured in liquid-tight relation to inner case 20, and which, with ends 22 and 24, provides a liquid-tight envelope to contain heat transfer material in order that heat may be imparted to the valve 12. The heat transfer material may be suitably admitted to the casing or vented therefrom through coupling 26 or 28, as desired, which couplings are preferably welded at the points shown. Heat transfer fluid condensate may be withdrawn through coupling 30 in the bottom of the case 18. Case 18 extends laterally in both directions beyond the end wall 22 and fits around coupling flange 32, through which extends the line 16, which terminates at lap 34, and which flange may suitably be connected as by bolts 33 to a flange of a pipe (not shown) to continue the line. Case 18 has lugs 36 integrally associated therewith and each provided with a hole which may be tapped, if desired. Semi-circular straps 38 fit the top portion of flanges 32 and are suitably provided with extensions 40, having holes adapted to register with the holes in extensions 36 to receive bolts 42.

The assembly of the structure is quite simple. With the valve in place, the envelope is inserted thereover and straps 38 placed thereon and bolted in place by bolts 42. Thereupon, suitable heat transfer fluid is introduced through the convenient one of coupling 26 or 28, and upon the valve reaching desired temperature, the same is ready for operation. Improved heat transfer may be obtained, if desired, by packing the space between the valve externals and the case 20 with solid heat transfer material 21, such as powdered metal or the like, as shown in Fig. IV.

The present structure is particularly adapted for handling lines in which materials of the character of molten caustic soda are travelling, which lines must be maintained at temperatures in excess of the melting temperature of caustic soda, i. e., above 620° F. For this purpose, a suitable heat transfer fluid may be maintained in the jacket, such as diphenyl oxide, diphenyl combinations, i. e., Dowtherm, the material being introduced at either coupling 26 or 28 in vapor form and withdrawn in vapor form at the other of coupling 26 or 28, outlet 30 being provided to drain condensate.

When the valve 12 requires servicing or replacing, it is necessary only to unbolt the bolts 42 and remove the straps 38, whereupon the entire assembly may be removed from its relation with the valve, a new valve inserted, or other changes made as desired.

While there have been described various embodiments of the invention, the apparatus described is not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A heat exchange jacket adapted to control the temperature of a fluid within the body of a valve, said jacket including a heat exchange fluid-confining space comprising a substantially U-shaped hollow envelope sealed at each end forming a trough, heat exchange fluid entrance and egress means to and from the space within said envelope, and means on said jacket for fixedly yet readily removably positioning said jacket about a valve thereby to establish effective heat transfer between said space and said trough.

2. A device as in claim 1 wherein said trough contains solid particles of a heat transfer material.

3. A heat exchange jacket for controlling the temperature of a high freezing point fluid, said jacket including a heat exchange fluid-confining space comprising substantially U-shaped co-extensive inner and outer case members forming a trough, sealed at each end, said jacket having entrance and egress means, and means for fixedly yet removably placing said trough about a valve to establish effective heat transfer between said space and said trough.

4. Means as in claim 3 wherein said inner case contains powdered metal.

References Cited in the file of this patent

UNITED STATES PATENTS

| | | |
|---|---|---|
| 275,342 | Park | Apr. 3, 1883 |
| 316,967 | Heber | May 5, 1885 |
| 319,765 | Westinghouse | June 9, 1885 |
| 327,561 | Lindsley | Oct. 6, 1885 |
| 441,141 | Dalton | Nov. 25, 1890 |
| 502,349 | Cornog | Aug. 1, 1893 |
| 1,668,949 | Cullen | May 8, 1928 |
| 2,518,863 | Camden | Aug. 15, 1950 |
| 2,564,427 | Rugiers | Aug. 14, 1951 |

FOREIGN PATENTS

| | | |
|---|---|---|
| 624,260 | Great Britain | June 1, 1949 |